United States Patent [19]
Bannai et al.

[11] Patent Number: 6,120,589
[45] Date of Patent: Sep. 19, 2000

[54] SET OF COLOR INK COMPOSITIONS FOR INK-JET PRINTING AND METHOD OF FORMING COLOR IMAGES USING THE COLOR INK SET

[75] Inventors: Akiko Bannai; Akio Kojima; Kiyofumi Nagai, all of Tokyo; Masato Igarashi; Masayuki Koyano, both of Kanagawa; Hiroyuki Mochizuki, Tokyo; Takanori Tsuyuki, Shizuoka; Ikuko Tanaka, Tokyo, all of Japan

[73] Assignee: Ricoh Company, Ltd., Tokyo, Japan

[21] Appl. No.: 09/253,035

[22] Filed: Feb. 19, 1999

[30] Foreign Application Priority Data

Feb. 20, 1998 [JP] Japan .................................. 10-056129

[51] Int. Cl.$^7$ .................................................. C09D 11/02
[52] U.S. Cl. .................................. 106/31.27; 106/31.43; 106/31.58
[58] Field of Search ........................... 106/31.27, 31.43, 106/31.58

[56] References Cited

U.S. PATENT DOCUMENTS

| | | | |
|---|---|---|---|
| 4,647,310 | 3/1987 | Shimada et al. | 106/31.48 |
| 4,711,668 | 12/1987 | Shimada et al. | 106/31.52 |
| 4,793,860 | 12/1988 | Murakami et al. | 106/31.52 |
| 5,431,720 | 7/1995 | Nagai et al. | 106/31.58 |
| 5,514,208 | 5/1996 | Nagai et al. | 106/31.43 |
| 5,622,550 | 4/1997 | Konishi et al. | 106/31.48 |
| 5,679,140 | 10/1997 | McInerney et al. | 106/31.27 |
| 5,729,360 | 3/1998 | Kita et al. | 358/500 |
| 5,772,742 | 6/1998 | Wang | 106/31.27 |
| 5,833,743 | 11/1998 | Elwakil | 106/31.27 |
| 5,851,273 | 12/1998 | Morris et al. | 106/31.27 |
| 5,858,075 | 1/1999 | Deardurff et al. | 106/31.27 |
| 5,879,439 | 3/1999 | Nagai et al. | 106/31.28 |
| 5,882,390 | 3/1999 | Nagai et al. | 106/31.49 |

*Primary Examiner*—Helene Klemanski
*Attorney, Agent, or Firm*—Oblon, Spivak, McClelland, Maier & Neustadt, P.C.

[57] ABSTRACT

A set of color ink compositions for ink-jet printing includes yellow, magenta and cyan ink composition, each of which having water, a water-soluble coloring agent, a wetting agent, a surfactant and an antiseptic and mildewproofing agent, and the yellow ink composition has the lightness index L* of 95±5 and the chromaticness indices a* and b* of respectively −6±5 and 23 ±12, the magenta ink composition has the lightness index L* of 75±5 and the chromaticness indices a* and b* of respectively 55±25 and −28±10, and the cyan ink composition has the lightness index L* of 87±5 and the chromaticness indices a* and b* of respectively −35±10 and −19±8. Further, color ink images are formed on a recording material with a Stöckigt sizing degree of 10 sec or more using the above set of color ink compositions and a printing head with a plurality of ink-ejecting orifices by performing dot printing on the recording material by ejecting the ink compositions from the ink-ejecting orifices with the printing head scanned over the recording material a plurality of times.

32 Claims, No Drawings

SET OF COLOR INK COMPOSITIONS FOR INK-JET PRINTING AND METHOD OF FORMING COLOR IMAGES USING THE COLOR INK SET

BACKGROUND OF THE INVENTION

1. Field of the Invention

The present invention relates to a set of color ink compositions for ink-jet printing and a method of forming a color ink image by use of the above-mentioned set of color ink compositions.

2. Discussion of Background

Ink-jet printing has been remarkably widely used in recent years because of the advantages that printing can be carried out at high speed, that various kinds of recording media including a sheet of plain paper are usable as image-receiving materials since the ink-jet printing is non-impact printing, and that a color image can be produced at low cost.

In order to perform excellent ink-jet printing over a long period of time, an ink composition for ink-jet printing is required to satisfy the following conditions;

(1) The ejection characteristics of the ink composition, such as the stability of the direction in which the ink composition is ejected and the stability of ink ejection are excellent.

(2) The preservation stability of the ink composition is excellent. Namely, no precipitates are generated due to chemical changes of the ink composition during an extended period of storage, or while in continuous use or not in use in an ink-jet printing apparatus. As a result, the nozzles of the ink jet printing apparatus are not clogged with the ink composition, and the change of physical properties of the ink composition does not take place during the above-mentioned periods.

(3) Ink images printed with the ink composition show sufficiently high contrast and clearness, free of ink spreading.

(4) Printed ink images dry rapidly.

(5) Ink images printed with the ink composition show excellent preservation stability in terms of the resistance to water and light.

(6) With respect to the color ink composition for a full-color printer, the ink composition has excellent color tone with high purity and is capable of producing color ink images with excellent color reproduction performance.

Many proposals are made to obtain high quality ink compositions for ink-jet printing which can meet the above-mentioned requirements. However, the fact is that there is no ink composition that can satisfy all the above-mentioned conditions.

A set of color ink compositions capable of forming color images with high water and light resistance, clearness and mutual color rendering properties is proposed in Japanese Laid-Open Patent Application 8-310116. The above-mentioned set of color ink compositions employs the combination of a yellow dye, a magenta dye, a cyan die and a black dye, each having a particular structure.

To obtain excellent color reproduction performance, the combination of C.I. Acid Yellow 23, C.I. Direct Red 227 and C.I. Acid Blue 9 is disclosed in U.S. Pat. No. 5,143,547; while the combination of C.I. Direct Yellow 86, C.I. Acid Red 52 and C.I. Acid Blue 9, in U.S. Pat. No. 5,145,519.

The above-mentioned requirements (1) to (6) mainly depend on a dye serving as a coloring agent for use in the ink composition. For instance, clear images with high contrast can be obtained by increasing the concentration of a dye in the ink composition. To increase the concentration of the dye in the ink composition, it is necessary that the solubility stability of the dye be high. However, when the solubility stability of the dye in the ink composition becomes high, the water resistance of the ink images printed by use of the above-mentioned ink composition is lowered although the preservation stability and the ejection stability of the ink composition are increased. Further, in the case where a color image is formed by ink-jet printing, excellent drying rate of the ink images is significant so as to minimize the ink spreading in a color boundary portion such as a portion where two colors are superimposed and so as to obtain a color ink image with higher resolution. In addition, the color tone of a dye for use in each color ink composition is also of great importance to improve the color reproduction of the printed ink image.

With respect to the color reproduction of a set of ink compositions, when the color gamut obtained from the chromaticness indices a* and b* of each of cyan, magenta and yellow color ink compositions becomes larger, the color reproduction becomes better. However, there is no set of color ink compositions that can produce a color image having such color measurement values as to exhibit color reproduction performance equivalent or superior to Japan Color. The above-mentioned Japan Color refers to the color obtained when Japan Color Ink SF-90 (standard process ink) is printed on Japan Paper (standard art paper) as a solid with a specific ink film thickness, which are defined by ISO-TC130 Japan committee in 1993.

The previously mentioned set of color ink compositions disclosed in Japanese Laid-Open Patent Application 8-310116 has the shortcomings that the water resistance of each dye is insufficient and the color tone and color reproduction performance are unsatisfactory.

In the color ink compositions disclosed in U.S. Pat. No. 5,143,547, C.I. Acid Yellow 23 for use in the yellow ink composition is poor in terms of the water resistance, and C.I. Direct Red 227 for use in the magenta ink composition is also unsatisfactory in terms of the water resistance and the color tone. In the combination of dyes proposed in U.S. Pat. No. 5,145,519, C.I. Direct Yellow 86 for use in the yellow ink composition has insufficient color tone.

As mentioned above, it is extremely difficult to obtain perfect combination of dyes, each of which can achieve a proper balance among the requirements for the color ink compositions.

Since the above-mentioned problems cannot be completely solved only by the dye component for use in the ink composition, other additive components such as a wetting agent and a surfactant are added to the ink composition. The wetting agent is employed to improve the ejection stability and the preservation stability of the ink composition, and the surfactant is added to the ink composition to improve the drying characteristics of the ink images printed by the ink composition.

Owing to the wetting agent, the coloring agent is stably soluble in water. Therefore, it is possible to prevent the clogging of nozzles of an ink-jet printing apparatus, which results from the precipitation of dye around the nozzles with the evaporation of water component. The more the amount of wetting agent, the better the preservation stability of the ink composition. However, when the amount of wetting agent is extremely increased, the viscosity of the ink composition is increased, and consequently, the ejection of the ink composition from the nozzles becomes difficult.

The surfactant works to decrease the surface tension of the ink composition, thereby enhancing the penetrating performance of the ink composition into an image receiving medium. The improvement of the penetrating performance of the ink composition makes it possible to accelerate the drying rate of the printed ink image. When color images are produced by an ink-jet color printer, the image quality is apt to deteriorate, for example, by the occurrence of ink spreading, in the image portions in a secondary color, such as red, green or blue obtained by superimposing two colors, even though the image quality of color images in a primary color such as yellow, magenta or cyan scarcely deteriorates. In particular, when an ink is deposited on an image receiving medium and dried without using any image fixing unit, the image quality is extremely decreased because of the ink spreading in the color boundary portions if the drying rate of the ink composition is slow. Unless a proper surfactant is selected, the ink spreading may become considerable depending on the kind of image receiving medium, and the drying characteristics may not be improved because of the mutual action of the employed surfactant and the coloring agent. Further, there occurs the problem that the surfactant itself is decomposed and such decomposition of the surfactant has an adverse effect on the image quality. In addition, even if the surface tension of the ink composition is decreased by the aid of surfactant, it is possible to prevent the ink composition from spreading on the image receiving medium after a droplet of ink composition is deposited thereon. As a result, the sharpness of the printed image is impaired.

SUMMARY OF THE INVENTION

Accordingly, a first object of the present invention is to provide a set of color ink compositions for ink-jet printing, free of the above-mentioned conventional shortcomings, in particular, having excellent color tone, water resistance, light resistance, color reproduction performance, preservation stability and ejection stability, those properties being in proper balance.

A second object of the present invention is to provide a method of forming color ink images using the above-mentioned set of color ink compositions.

The above-mentioned first object of the present invention can be achieved by a set of color ink compositions for ink-jet printing comprising a yellow ink composition, a magenta ink composition and a cyan ink composition, each of which color ink compositions comprising water, a water-soluble coloring agent, a wetting agent, a surfactant and an antiseptic and mildewproofing agent, each of the yellow ink composition, the magenta ink composition and the cyan ink composition having the following lightness index $L^*$, and chromaticness indices $a^*$ and $b^*$ in $L^*a^*b^*$ color space, which are calculated from a spectral transmittance of each of the ink compositions which are diluted with water 2000 times:

the yellow ink composition: $L^*=95\pm5$, $a^*=-6\pm5$, $b^*=23\pm12$, the magenta ink composition: $L^*=75\pm5$, $a^*=55\pm25$, $b^*=-28\pm10$, and the cyan ink composition: $L^*=87\pm5$, $a^*=35\pm10$, $b^*=-19\pm8$.

The above-mentioned set of color ink compositions may further comprise a black ink composition which comprises water, a water-soluble coloring agent, a wetting agent, a surfactant and an antiseptic and mildewproofing agent, and has the following lightness index $L^*$, and chromaticness indices $a^*$ and $b^*$ in $L^*a^*b^*$ color space, which are calculated from a spectral transmittance of the black ink composition which is diluted with water 2000 times:

the black ink composition: $L^*=45\pm8$, $a^*=-3\pm5$, $b^*=-5\pm5$.

It is preferable that the coloring agent for use in the yellow ink composition comprise Pro-jet Fast Yellow 2 (C.I. Direct Yellow 173) and C.I. Direct Yellow 142, the coloring agent for use in the magenta ink composition comprise C.I. Acid Red 52, and the coloring agent for use in the cyan ink composition comprise Pro-jet Fast Cyan 2 (C.I. Direct Blue 307). Further, the black ink composition may comprise a coloring agent such as C.I. Direct Black 168.

The second object of the present invention can be achieved by a method of forming color ink images on an image receiving medium with a Stöckigt sizing degree of 10 sec or more, using the above-mentioned set of color ink compositions and a printing head comprising a plurality of ink-ejecting orifices, comprising the step of performing dot printing on the image receiving medium with the set of ink compositions by ejecting the color ink compositions from the ink-ejecting orifices with the printing head scanned over the image receiving medium a plurality of times.

DESCRIPTION OF THE PREFERRED EMBODIMENTS

A set of color ink compositions for ink-jet printing according to the present invention comprises a yellow ink composition, a magenta ink composition, and a cyan ink composition, each of which color ink compositions comprises water, a water-soluble coloring agent, a wetting agent, a surfactant and an antiseptic and mildewproofing agent. In such a set of color ink compositions, the lightness index $L^*$ and the chromaticness indices $a^*$ and $b^*$ of each color ink composition in the $L^*a^*b^*$ color space are controlled as shown below:

Yellow ink composition: $L^*=95\pm5$, $a^*=-6\pm5$, $b^*=23\pm12$,

Magenta ink composition: $L^*=75\pm5$, $a^*=55\pm25$, $b^*=-28\pm10$, and

Cyan ink composition: $L^*=87\pm5$, $a^*=35\pm10$, $b^*=-19\pm8$.

The color tone and color reproduction performance of the color ink compositions according to the present invention are excellent because the lightness index $L^*$ and the chromaticness indices $a^*$ and $b^*$ of each color ink composition in the $L^*a^*b^*$ color space are particularly specified as mentioned above.

In this case, the lightness index $L^*$ and the chromaticness indices $a^*$ and $b^*$ in the $L^*a^*b^*$ color space are calculated from the spectral transmittance of each of the ink compositions which are diluted with water 2000 times.

Furthermore, the preferable lightness index $L^*$ and chromaticness indices $a^*$ and $b^*$ of each color ink composition in the $L^*a^*b^*$ color space are as follows:

Yellow ink composition: $L^*=95$–$100$, $a^*=-6\pm3$, $b^*=23\pm8$,

Magenta ink composition: $L^*=75\pm3$, $a^*=55\pm15$, $b^*=-28\pm10$, and

Cyan ink composition: $L^*=87\pm3$, $a^*=35\pm5$, $b^*=-19\pm5$.

Further, it is more preferable that each color ink composition have the following lightness index $L^*$ and chromaticness indices $a^*$ and $b^*$ in the $L^*a^*b^*$ color:

Yellow ink composition: $L^*=97$–$100$, $a^*=-6\pm2$, $b^*=23\pm5$,

Magenta ink composition: $L^*=75\pm2$, $a^*=55\pm10$, $b^*=-28\pm5$, and

Cyan ink composition: $L^*=87\pm2$, $a^*=35\pm3$, $b^*=-19\pm3$.

The set of color ink compositions according to the present invention may further comprise a black ink composition. In this case, it is preferable that the black ink composition have a lightness index $L^*$ of $45\pm8$ and chromaticness indices $a^*$ and $b^*$ of respectively $-3\pm5$ and $-5\pm5$, more preferably a lightness index $L^*$ of 37 to 45 and chromaticness indices $a^*$ and $b^*$ of respectively $-3\pm3$ and $-5\pm3$, and most preferably, a lightness index $L^*$ of 40 to 45 and chromaticness indices $a^*$ and $b^*$ of respectively $-3\pm2$ and $-5\pm2$.

Further, when the coloring agent for use in the yellow ink composition comprises Pro-jet Fast Yellow 2 (made by ZENECA K.K.) and C.I. Direct Yellow 142, the coloring agent for use in the magenta ink composition comprises C.I. Acid Red 52, and the coloring agent for use in the cyan ink composition comprises Pro-jet Fast Cyan 2 (made by ZENECA K.K.), not only the color tone and color reproduction performance, but also the water resistance, the light resistance, the preservation stability and the ejection stability can be improved. In the case where the black ink composition is added to the set of ink compositions, it is preferable that the coloring agent for use in the black ink composition comprise C.I. Direct Black 168. Thus, there can be provided a set of color ink compositions which can achieve a proper balance among the above-mentioned characteristics.

The coloring agent for use in each color ink composition may further comprise other conventional dyes than the above-mentioned particular dyes so long as they have no adverse effect on the color tone and other characteristics of the color ink composition.

Specific examples of acid dyes and food dyes which are usable in combination with the above-mentioned particular dyes are as follows:

C.I. Acid Yellow 17, 23, 42, 44, 79 and 142;
C.I. Acid Red 1, 8, 13, 14, 18, 26, 27, 35, 37, 42, 87, 89, 92, 97, 106, 111, 114, 115, 134, 186, 249, 254 and 289;
C.I. Acid blue 9, 29, 45, 92 and 249;
C.I. Acid black 1, 2, 7, 24, 26 and 94;
C.I. Food Yellow 3 and 4;
C.I. Food Red 7, 9 and 14; and
C.I. Food Black 1 and 2.

Specific examples of direct dyes usable in the present invention are as follows:

C.I. Direct Yellow 1, 12, 24, 26, 33, 44, 50, 86, 120, 132, 142 and 144;
C.I. Direct Red 1, 4, 9, 13, 17, 20, 28, 31, 39, 80, 81, 83, 89, 225 and 227;
C.I. Direct Orange 26, 29, 62 and 102;
C.I. Direct Blue 1, 2, 6, 15, 22, 25, 71, 76, 79, 86, 87, 90, 98, 163, 165, 199 and 202; and
C.I. Direct Black 19, 22, 32, 38, 51, 56, 71, 74, 75, 77, 154 and 171.

It is preferable that the wetting agent for use in each color ink composition comprise a mixture of glycerol and diethylene glycol in order to further improve the preservation stability and the ejection stability of the ink composition. So long as the characteristics of the obtained ink composition are not impaired, the following wetting agents may be used in combination with the mixture of glycerol and diethylene glycol.

Specific examples of such a wetting agent for use in the present invention are polyhydric alcohols such as ethylene glycol, triethylene glycol, polyethylene glycol, polypropylene glycol, 1,5-pentanediol, 1,6-hexanediol, 1,2,6-hexametriol, 1,2,4-butanetriol, 1,2,3-butanetriol, and 3-methylpentane-1,3,5-triol; alkyl ethers derived from polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers derived from polyhydric alcohols such as ethylene glycol monophenyl ether, and ethylene glycol monobenzyl ether; and nitrogen-containing heterocyclic compounds such as 2-pyrrolidone, N-methyl-2-pyrrolidone, N-hydroxyethyl-2-pyrrolidone, 1,3-dimethylimidazolidinone, and ε-caprolactam. The wetting agents for the present invention are not limited to the above compounds.

It is preferable that the amount of wetting agent be in a range of 10 to 30 wt. %, more preferably in a range of 12 to 20 wt. %, of the entire weight of each ink composition. When the amount of wetting agent is within the above-mentioned range, the solubility stability of the dye in the ink composition is sufficient enough to minimize the deposition of the dye around the nozzles of the ink-jet printer. At the same time, the increase in viscosity of the ink composition, which results from the change of environmental temperature, can be prevented.

Furthermore, clear color images with improved drying characteristics can be formed on an image receiving material without ink spreading in the color boundary portions and in the character image portions when each ink composition comprises a surfactant represented by the following formula (1):

$$RO(CH_2CH_2O)_nCH_2COO^-M^+ \qquad (1)$$

wherein R is a straight-chain or branched alkyl group having 6 to 14 carbon atoms; n is an integer of 3 to 12; and $M^+$ is an alkali metal cation, a quaternary ammonium cation, a quaternary phosphonium cation or an alkanolamine cation.

The above-mentioned surfactant is commercially available, for example, under the trademark of "Nikkol ECT series", made by Nihon Surfactant Kogyo K.K.

Furthermore, in the present invention, the ink composition of the present invention may further comprise other surfactants than the above-mentioned surfactant as long as such additional surfactants do not affect the physical properties of the ink composition.

Examples of those surfactants for use in the present invention include nonionic surfactants such as polyoxyethylene alkyl ether, polyoxyethylene alkylphenyl ether, polyoxyethylene glycol ester, acetylene-based surfactant and silicon-based surfactant, and anionic surfactants such as dialkylsulfosuccinate.

The above-mentioned surfactants are also commercially available under the trademarks of "BT series", made by Nikko Chemicals Co., Ltd.; "Nonipol", made by Sanyo Chemical Industries, Ltd.; "Surfynol", made by Air Products & Chemicals Inc.; and "SH series", made by Dow Corning Toray Silicone Co., Ltd.

The above-mentioned surfactants are contained in the ink composition to improve the drying rate of the printed ink image by decreasing the surface tension of the ink composition and increasing the penetration of the ink composition into an image receiving material. The amount of surfactant may be therefore controlled so as to obtain a surface tension of the ink composition of 50 mN/m or less, preferably 40 mN/m or less. It is preferable that the amount of surfactant be in a range of 0.5 to 3.0 wt. % of the entire weight of each ink composition. When the amount of the surfactant is within the above-mentioned range, the drying characteristics are improved because proper dynamic surface tension can be obtained. Further, the surfactant can be prevented from precipitating during the storage of the ink compositions when the amount of surfactant can be controlled as mentioned above.

In the above-mentioned surfactant of formula (1) for use in each color ink composition, it is preferable that $M^+$ in formula (1) represent a cation selected from the group consisting of an alkali metal cation, a quaternary ammonium cation, a quaternary phosphonium cation and an alkanolamine cation.

When the cation represented by $M^+$ in formula (1) is an alkali metal cation, $Na^+$ and $Li^+$ are preferable.

Further, it is preferable that a quaternary ammonium cation represented by $M^+$ be a cation of formula (2);

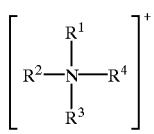

(2)

wherein $R^1$ to $R^4$ are each selected from the group consisting of a hydrogen atom, an alkyl group having 1 to 4 carbon atoms, and a halogenated alkyl group having 1 to 4 carbon atoms.

In addition, it is preferable that an alkanolamine cation represented by $M^+$ be a cation of formula (3):

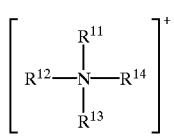

(3)

wherein at least one of $R^{11}$ to $R^{14}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms.

It is preferable that a quaternary phosphonium cation represented by $M^+$ be a cation of formula (4):

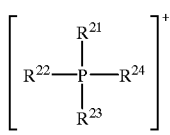

(4)

wherein $R^{21}$ to $R^{24}$ are each selected from the group consisting of a hydrogen atom, an alkyl group having 1 to 4 carbon atoms, a hydroxyl alkyl group having 1 to 4 carbon atoms, and a halogenated alkyl group having 1 to 4 carbon atoms.

Similarly, it is preferable that the coloring agent for use in each color ink composition comprise a dye compound which comprises an alkali metal cation such as $Na^+$ or $Li^+$, a quaternary ammonium cation represented by the previously mentioned formula (2), an alkanolamine cation represented by the previously mentioned formula (3), or a quaternary phosphonium cation represented by the previously mentioned formula (4).

When the counter cation $M^+$ in the surfactant and the dye compound is the above-mentioned alkali metal cation such as $Na^+$ or $Li^{30}$, quaternary ammonium cation, alkanolamine cation, or quaternary phosphonium cation, the water-soluble stabilities of the dye and the surfactant are improved, and the printed images show excellent image quality.

A water-soluble dye or surfactant in the form of such an alkali salt can be produced by the addition of a hydroxide containing a desired alkali ion in the course of the preparation of the ink composition. For example, a water-soluble dye or surfactant in the form of a lithium salt can be produced by the addition of lithium hydroxide.

Each of the color ink compositions comprises an antiseptic and mildewproofing agent. When the antiseptic and mildewproofing agent comprises 1,2-benzisothiazoline-3-on, the reliability with respect to the preservation stability and the ejection stability can be ensured, and both the ink compositions and the printed ink images can be provided with sufficient antiseptic and mildewproofing effect.

It is preferable that the amount of antiseptic and mildewproofing agent be in a range of 0.2 to 1.0 wt. % of the entire weight of each ink composition. By the addition of the antiseptic and mildewproofing agent in such an amount to the ink composition, sufficient antiseptic and mildewproofing effect can be obtained without causing the problem of precipitation of the antiseptic and mildewproofing agent itself.

To be more specific, there can be employed commercially available antiseptic and mildewproofing agents containing 1,2-benzisothiaxoline-3-on, "San-ai-bac-ZP™" (made by San-Ai Oil Co., Ltd.) and "Proxel XL™" (made by I.C.I., Ltd.).

In the present invention, it is preferable that each of the color ink compositions have a pH of 8 to 11, more preferably a pH in the range of 10.5±0.3 when the influence on metal constituting a metal plate provided with ink-ejecting orifices by the ink compositions is taken into consideration. Thus, the reliability of the color ink compositions is further increased.

Each of the color ink compositions may further comprise a penetrating agent, a corrosion inhibitor, a water-soluble ultraviolet absorbing agent and a water-soluble infrared absorbing agent when necessary.

According to the present invention, color ink images are formed on an image receiving medium with low ink absorption properties, that is, with a Stöckigt sizing degree of 10 sec or more, using the set of color ink compositions as mentioned above and a printing head comprising a plurality of ink-ejecting orifices in such a manner that dot printing is performed on the image receiving medium with the set of ink compositions by ejecting the color ink compositions from the ink-ejecting orifices with the printing head scanned over the image receiving medium a plurality of times. Thus, it is possible to produce high quality color ink images with sharpness.

Other features of this invention will become apparent in the course of the following description of exemplary embodiments, which are given for illustration of the invention and are not intended to be limiting thereof.

EXAMPLE 1

A mixture of the following components was stirred and dissolved at room temperature:

[Formulation for Yellow Ink Composition]

| | Wt. % |
|---|---|
| Pro-jet Fast Yellow 2 (made by ZENECA K. K.) | 1.5 |
| C.I. Direct Yellow 142 (made by Daiwa Dyestuff Mfg. Co., Ltd.) | 0.5 |
| Diethylene glycol | 15 |
| Glycerin | 5 |
| Surfactant "ECTD-3NEX" (Trademark), made by Nikko Chemicals Co., Ltd. | 1 |
| Antiseptic and mildewproofing agent "San-ai-bac-AP" (Trademark), made by San-Ai Oil Co., Ltd. | 0.4 |
| Deionized water | 76.6 |

[Formulation for Magenta Ink Composition]

| | Wt. % |
|---|---|
| C.I. Acid Red 52 (made by Daiwa Dyestuff Mfg. Co., Ltd.) | 0.7 |
| Dye "MJR611" (Trademark), made by Mitsubishi Chemical Industries Limited. | 1.3 |
| Diethylene glycol | 15 |
| Glycerin | 5 |
| Surfactant "ECTD-3NEX" (Trademark), made by Nikko Chemicals Co., Ltd. | 1 |
| Antiseptic and mildewproofing agent "Proxel XL" (Trademark), made by I.C.I., Ltd. | 0.4 |
| Deionized water | 76.6 |

[Formulation for Cyan Ink Composition]

| | Wt. % |
|---|---|
| Pro-jet Fast Cyan 2 (made by ZENECA K.K.) | 3 |
| Diethylene glycol | 15 |
| Glycerin | 5 |
| Surfactant "ECTD-3NEX" (Trademark), made by Nikko Chemicals Co., Ltd. | 1 |
| Antiseptic and mildewproofing agent "San-ai-bac-AP" (Trademark), made by San-Ai Oil Co., Ltd. | 0.4 |
| Deionized water | 75.6 |

[Formulation for Black Ink Composition]

| | Wt. % |
|---|---|
| C.I. Direct Black 168 (made by ZENECA K.K.) | 4 |
| Diethylene glycol | 15 |
| Glycerin | 5 |
| Surfactant "ECTD-3NEX" (Trademark), made by Nikko Chemicals Co., Ltd. | 1 |
| Antiseptic and mildewproofing agent "Proxel XL" (Trademark), made by I.C.I., Ltd. | 0.4 |
| Deionized water | 74.6 |

The pH of each mixture was controlled to 10.5 by the addition of lithium hydroxide thereto. Thereafter, each mixture was filtered through a Teflon filter with a mesh of 0.22 μm, and then deaerated for about 30 minutes, whereby a set of a yellow ink composition, a magenta ink composition, a cyan ink composition and a black ink composition No. 1 according to the present invention was prepared.

Each of the above prepared color ink compositions was diluted with pure water 2000 times, and the spectral transmittance was measured using a spectrophotometer. From the thus obtained spectral transmittance, the lightness index $L^*$ and the chromaticness indices $a^*$ and $b^*$ in the $L^*a^*b^*$ color space obtained by use of a light source of $D_{50}$ were calculated.

The results are shown in Table 1.

Furthermore, the following tests were conducted to evaluate the characteristics of the color ink compositions No. 1 prepared in Example 1.

(1) Water Resistance Inspection Test

An ink-image-bearing sample prepared by use of a set of color ink compositions No. 1 was immersed in water of 30° C. for one minute, and the image densities of the printed ink image were measured by use of a McBeth densitometer before and after water immersion. The water resistance of the printed ink image was expressed by the fading ration (%), which was obtained in accordance with the following formula:

$$\text{Fading Ratio (\%)} = 1 - \left[\frac{I.D. \text{ after water immersion}}{I.D. \text{ before water immersion}}\right] \times 100$$

The results are shown in Table 1, in which "o" denotes that the fading ratio was less than 30%; and "x" denotes that the fading ratio was 30% or more.

(2) Image Clearness Inspection Test

Color ink images were formed on three kinds of image receiving media, that is, commercially available recycled paper, copy paper, and special paper for ink-jet printing, using a set of color ink compositions No. 1. The image quality of the printed color images was evaluated by visual inspection from the viewpoints of ink spreading, color tone and image density.

The results are shown in Table 1, in which "o" denotes that there was no problem observed on all the three kinds of papers; and "x" denotes that some problems occurred on at least one kind of paper.

(3) preservation Stability Inspection Test

Three samples were prepared from each ink composition and separately placed in a polyethylene container, and allowed to stand at −20° C., 20° C. and 50° C. for two months. After the storage of two months, the presence or absence of a precipitate in each sample was visually inspected, and the changes in the physical properties such as the surface tension and the viscosity were inspected.

The results are shown in Table 1, in which "o" denotes that the physical properties of the ink composition were not changed and no precipitate was observed under any of the above-mentioned preservation temperature conditions; and "x" denotes that the physical properties of the ink composition were changed, and precipitates were observed under at least one of the above-mentioned preservation temperature conditions.

(4) Ink-ejection Performance Reliability Test

A set of color ink compositions No. 1 prepared in Example 1 was set in an ink-jet printer having a printer head comprising a nozzle plate made of nickel and nozzles provided thereon at 300 dpi capable of ejecting the ink composition therefrom by the application of pressure thereto by the action of a piezoelectric element of PZT.

The above-mentioned ink-jet printer was allowed to stand at room temperature for 3 months with the printer head being in a capping condition. After 3 months, the printing operation was carried out without cleaning the nozzles or after performing one-time cleaning operation by wiping or sucking the nozzles. The accuracy of the dot size and the dot position printed on an image receiving medium was compared before and after the ink-jet printer was allowed to stand for 3 months.

The results are shown in Table 1, in which "o" denotes that the dot size and the dot position were not changed even when the printing was resumed without cleaning the nozzles; "Δ" denotes that the dot size and the dot position were accurately recovered when the printing was resumed after one-time cleaning operation; "x" denotes that the dot size and the dot position were changed even though the printing was resumed after the cleaning operation.

Comparative Example 1

A mixture of the following components was stirred and dissolved at room temperature:

[Formulation for Yellow Ink Composition]

|  | Wt. % |
|---|---|
| C.I. Acid Yellow 23 | 1.5 |
| Diethylene glycol | 15 |
| Glycerin | 5 |
| Surfactant "ECTD-3NEX" (Trademark), made by Nikko Chemicals Co., Ltd. | 1 |
| Antiseptic and mildewproofing agent "San-ai-bac-AP" (Trademark), made by San-Ai Oil Co., Ltd. | 0.4 |
| Deionized water | 77.1 |

[Formulation for Magenta Ink Composition]

|  | Wt. % |
|---|---|
| C.I. Direct Red 227 | 3 |
| Diethylene glycol | 15 |
| Glycerin | 5 |
| Surfactant "ECTD-3NEX" (Trademark), made by Nikko Chemicals Co., Ltd. | 1 |
| Antiseptic and mildewproofing agent "San-ai-bac-AP" (Trademark), made by San-Ai Oil Co., Ltd. | 0.4 |
| Deionized water | 75.6 |

[Formulation for Cyan Ink Composition]

|  | Wt. % |
|---|---|
| C.I. Direct Blue 199 | 3 |
| Diethylene glycol | 15 |
| Glycerin | 5 |
| Surfactant "ECTD-3NEX" (Trademark), Made by Nikko Chemicals Co., Ltd. | 1 |
| Antiseptic and mildewproofing agent "San-ai-bac-APY" (Trademark), made by San-Ai Oil Co., Ltd. | 0.4 |
| Deionized water | 75.6 |

[Formulation for Black Ink Composition]

|  | Wt. % |
|---|---|
| Fast Black 2 (made by ZENECA K.K.) | 3 |
| Diethylene glycol | 15 |
| Glycerin | 5 |
| Surfactant "ECTD-3NEX" (Trademark), made by Nikko Chemicals Co., Ltd. | 1 |
| Antiseptic and mildewproofing agent "Proxel XL" (Trademark), made by I.C.I., Ltd. | 0.4 |
| Deionized water | 75.6 |

The pH of each mixture was controlled to 10.5 by the addition of lithium hydroxide thereto. Thereafter, each mixture was filtered through a Teflon filter with a mesh of 0.22 μm, and then deaerated for about 30 minutes, whereby a comparative set No. 1 of a yellow ink composition, a magenta ink composition, a cyan ink composition and a black ink composition was prepared.

The lightness index L* and the chromaticness indices a* and b* in the L*a*b* color space of each comparative color ink composition were calculated from the spectral transmittance in the same manner as mentioned in Example 1.

The results are shown in Table 1.

Furthermore, the previously mentioned evaluation tests (1) to (4) were conducted using the comparative set No. 1 of color ink compositions.

The results are shown in Table 1. As is apparent from Table 1, the water resistance of the printed image was poor and the color tone was unsatisfactory.

Comparative Example 2

A mixture of the following components was stirred and dissolved at room temperature:

Formulation for Yellow Ink Composition

|  | Wt. % |
|---|---|
| Pro-jet Fast Yellow 2 (made by ZENECA K.K.) | 2 |
| 1,5-pentanediol | 10 |
| Glycerin | 2 |
| Surfactant "ECTD-3NEX" (Trademark), made by Nikko Chemicals Co., Ltd. | 1 |
| Antiseptic and mildewproofing agent "San-ai-bac-AP" (Trademark), made by San-Ai Oil Co., Ltd. | 0.4 |
| Deionized water | 84.6 |

Formulation for Magenta Ink Composition

|  | Wt. % |
|---|---|
| C.I. Acid Red 52 (made by Daiwa Dyestuff Mfg. Co., Ltd.) | 1.8 |
| 1,5-pentanediol | 10 |
| Surfactant "ECTD-3NEX" (Trademark), made by Nikko Chemicals Co., Ltd. | 1 |
| Antiseptic and mildewproofing agent "San-ai-bac-AP" (Trademark), made by San-Ai | 0.4 |

-continued

| | Wt. % |
|---|---|
| Oil Co., Ltd. | |
| Deionized water | 84.8 |

Formulation for Cyan Ink Composition

| | Wt. % |
|---|---|
| Pro-jet Fast Cyan 2 (made by ZENECA K.K.) | 3 |
| Diethylene glycol | 5 |
| Glycerin | 2 |
| Surfactant "ECTD-3NEX" (Trademark), made by Nikko Chemicals Co., Ltd. | 1 |
| Antiseptic and mildewproofing agent "San-ai-bac-AP" (Trademark), made by San-Ai Oil Co., Ltd. | 0.4 |
| Deionized water | 88.6 |

Formulation for Black Ink Composition

| | Wt. % |
|---|---|
| C.I. Direct Black 168 (made by ZENECA K.K.) | 4 |
| Diethylene glycol | 23 |
| Glycerin | 10 |
| Surfactant "ECTD-3NEX" (Trademark), made by Nikko Chemicals Co., Ltd. | 1 |
| Antiseptic and mildewproofing agent "San-ai-bac-AP" (Trademark), made by San-Ai Oil Co., Ltd. | 0.4 |
| Deionized water | 61.6 |

The pH of each mixture was controlled to 10.5 by the addition of lithium hydroxide thereto. Thereafter, each mixture was filtered through a Teflon filter with a mesh of 0.22 μm, and then deaerated for about 30 minutes, whereby a comparative set No. 2 of a yellow ink composition, a magenta ink composition, a cyan ink composition and a black ink composition was prepared.

The lightness index $L^*$ and the chromaticness indices $a^*$ and $b^*$ in the $L^*a^*b^*$ color space of each comparative color ink composition were calculated from the spectral transmittance in the same manner as mentioned in Example 1.

The results are shown in Table 1.

Furthermore, the previously mentioned evaluation tests (1) to (4) were conducted using the comparative set No. 2 of color ink compositions.

The results are shown in Table 1. It is confirmed that the ink-ejection performance reliability of each color ink composition was unsatisfactory.

Example 2

The procedure for preparation of the color ink compositions No. 1 according to the present invention in Example 1 was repeated except that the anionic surfactant (Trademark "ECTD-3NEX", made by Nikko Chemicals Co., Ltd.) for use in the formulation for each color ink composition in Example 1 was replaced by a commercially available nonionic surfactant (Trademark "BT-7", made by Nikko Chemicals Co., Ltd.).

Thus, a set of color ink compositions No. 2 according to the present invention was prepared.

The lightness index $L^*$ and the chromaticness indices $a^*$ and $b^*$ in the $L^*a^*b^*$ color space of each color ink composition were calculated from the spectral transmittance in the same manner as mentioned in Example 1.

The results are shown in Table 1.

Furthermore, the previously mentioned evaluation tests (1) to (4) were conducted using the set of color ink compositions No. 2.

The results are shown in Table 1.

TABLE 1

| | | $L^*a^*b^*$ Color Space | | | Water Resistance | Image Clearness | | | Preservation | |
| | | | | | | Ink Spreading | Color Tone | Image density | Stability | Reliability |
| | | $L^*$ | $a^*$ | $b^*$ | | | | | | |
| Ex. 1 | Y | 99 | −6 | 24 | ○ | ○ | ○ | ○ | ○ | ○ |
| | M | 75 | 55 | −28 | ○ | | | | ○ | ○ |
| | C | 87 | −35 | −19 | ○ | | | | ○ | ○ |
| | K | 45 | −3 | −5 | ○ | | | | ○ | ○ |
| Ex. 2 | Y | 99 | −6 | 24 | ○ | X | ○ | ○ | ○ | ○ |
| | M | 75 | 55 | −28 | ○ | | | | ○ | ○ |
| | C | 87 | −35 | −19 | ○ | | | | ○ | ○ |
| | K | 45 | −3 | −5 | ○ | | | | ○ | ○ |
| Comp. Ex. 1 | Y | 99 | −8 | 32 | X | ○ | X | X | ○ | ○ |
| | M | 76 | 53 | −16 | ○ | | | | ○ | ○ |
| | C | 81 | −37 | −31 | X | | | | ○ | ○ |
| | K | 52 | 19 | −22 | ○ | | | | ○ | Δ |

TABLE 1-continued

|  |  | L*a*b* Color Space | | | Water Resist- ance | Image Clearness | | | | Preservation | |
|---|---|---|---|---|---|---|---|---|---|---|---|
|  |  | L* | a* | b* |  | Ink Spread-ing | Color Tone | Image den-sity | | Sta-bili-ty | Reli-abili-ty |
| Comp. Ex. 2 | Y | 99 | −6 | 19 | ○ | ○ | ○ | ○ | | ○ | X |
|  | M | 68 | 65 | −46 | X |  |  |  | | X | Δ |
|  | C | 87 | −35 | −19 | ○ |  |  |  | | ○ | X |
|  | K | 45 | −3 | −5 | ○ |  |  |  | | ○ | Δ |

(5) Image Clearness Inspection Test (by scanning method)

The clearness of the printed image depending upon the number of scanning times in the dot printing was evaluated using the set of ink compositions No. 1 according to the present invention and the set of ink compositions No. 2 according to the present invention.

Color ink images were printed on three kinds of image receiving media, that is, commercially available recycled paper, copy paper, and special paper for ink-jet printing by the following two printing methods:

1. One-time Scanning Method

Dot printing was performed by having the printing head scanned over the image receiving medium once in the main scanning direction thereof, with the ink compositions ejected from every nozzle arranged in the main scanning direction onto the image receiving medium.

2. Two-scanning Method

Dot printing was performed by having the printing head scanned over the image receiving medium twice in the main scanning direction thereof, with the ink compositions ejected from alternate nozzles arranged in the main scanning direction onto the image receiving medium.

The image quality of the printed color images was evaluated by visual inspection in terms of the ink spreading in the color boundary portion formed by superimposing two colors and the blurring of character images.

The results are shown in the following Table 2.

TABLE 2

|  | Printing by One-time Scanning | | Printing by Two-time Scanning | |
|---|---|---|---|---|
|  | Ink spreading at color boundary | Character image blurring | Ink spreading at color boundary | Character image blurring |
| Ink compositions prepared in Ex. 1 | A' | A' | A | A |
| Ink compositions prepared in Ex. 2 | B' | B' | B | B |

In Table 2;
"A'" denotes that there was no ink spreading along the fibers contained in the employed recording sheet, and a dot image on the fibers was securely retained.
"A" denotes that there was faint ink spreading along the fibers contained in the employed recording sheet, but it was not recognized by visual inspection.
"B'" denotes that ink spreading was slightly recognized by visual inspection.
"B" denotes that the ink spreading was observed, but acceptable in practical use.

As can be seen from the results shown in Table 2, the image clearness in terms of the ink spreading at the color boundary portion formed by superimposing the two colors is remarkably improved when the ink-jet printing method is carried out by two-time scanning operation in any case.

Example 3

The procedure for preparation of the color ink compositions No. 1 according to the present invention in Example 1 was repeated except that the antiseptic and mildewproofing agent for use in the formulation for each color ink composition in Example 1 was removed therefrom.

Thus, a set of color ink compositions No. 3 according to the present invention was prepared.

Example 4

The procedure for preparation of the color ink compositions No. 1 according to the present invention in Example 1 was repeated except that the antiseptic and mildewproofing agent for use in the formulation for each color ink composition in Example 1 was replaced by a commercially available antiseptic and mildewproofing agent "San-ai-bac-P100" (Trademark), made by San-Ai Oil Co., Ltd.

Thus, a set of color ink compositions No. 4 according to the present invention was prepared.

Using the sets of ink compositions No. 1, No. 3 and No. 4, respectively prepared in Examples 1, 3 and 4, the following tests (6) and (7) were carried out.

(6) Antiseptic and Mildewproofing Test

A suspension (i) of sample bacteria and a suspension (ii) of mixed spores, independently in an amount of 1 vol. %, were injected into 100 ml of each color ink composition every predetermined days. The culture solutions thus obtained were placed in a temperature controlled bath of 28±2° C. Two days after the completion of injection, the growth of bacteria was observed by the pour culture method. Such a cycle of culture of the bacteria was repeated 10 times, and thereafter the antiseptic and mildewproofing effects obtained by the addition of the respective antiseptic and mildewproofing agents to the ink composition were evaluated.

In this evaluation, the above-mentioned suspension (i) of sample bacteria was prepared by putting the following strains into a broth: Bacillus subtilis, Escherichia coli, Proteus vulgaris, Pseudomonas aeruginosa, and Staphylococcus aureus. In this case, the above-mentioned broth was prepared by dissolving 3 g of meat extract, 10 g of peptone and 5 g of sodium chloride in 1000 ml of distilled water. The solution thus obtained was subjected to autoclave sterilization at 121° C. for 15 minutes.

In addition, the suspension (ii) of mixed spores was obtained in such a manner that an aqueous solution of sodium dioctyl sulfosuccinate in an amount of 0.005 vol. % was prepared in a conical flask, and the thus prepared aqueous solution was subjected to autoclave sterilization.

Then, spores of the sample bacteria shown below were picked with a platinum loop, and added to the above-mentioned aqueous solution, and completely dispersed in the aqueous solution. Thereafter, the dispersion thus obtained was filtered through a filter paper which has been subjected to dry sterilization, thereby obtaining a filtrate in another flask. Thus, the above-mentioned suspension (ii) of mixed spores was obtained.

Sample bacteria: *Aspergillus niger, Penicillium citrinum, Chaetomium globosum,* and *Myrothecium verrucaria*.

The results are shown in Table 3, in which "A" denotes that no fungus generated in the course of 10 culture cycles, and "B" denotes that there was generated any fungus during the culture cycles.

(7) Metal Corrosion Test

A nickel plate with a surface area of 2 cm$^2$ which constituted a plate provided with ink-ejecting orifices for use in an ink-jet printer was immersed in 20 ml of each color ink composition, and allowed to stand at 60° C. for 2 weeks.

The amount of nickel ion in the color ink composition was measured using an inductively coupled plasma (ICP) emission analysis apparatus immediately after immersion and after 2 weeks.

The results are shown in Table 3, in which "A" denotes the increase in amount of nickel ion was 2 ppm or less, and "B" denotes that the increase in amount of nickel ion exceeded 2 ppm.

TABLE 3

|  | Antiseptic and Mildewproofing Test | Metal Corrosion Test |
|---|---|---|
| Ink compositions prepared in Ex. 1 | A | A |
| Ink compositions prepared in Ex. 3 | B | A |
| Ink compositions prepared in Ex. 4 | A | B |

As is apparent from the results shown in Table 3, the ink compositions prepared in Example 1 show excellent antiseptic and mildewproofing effect, and in addition, corrosion of metals can be effectively prevented when the ink compositions prepared in Example 1 were employed.

Example 5

The procedure for preparation of the color ink compositions No. 1 according to the present invention in Example 1 was repeated except that adjustment of the pH value of each ink composition by the addition thereto of lithium hydroxide was not carried out.

Thus, a set of color ink compositions No. 5 according to the present invention was prepared.

Using the above prepared set of color ink compositions No. 5, the previously mentioned evaluation tests (4) and (7) were conducted to respectively evaluate the ink-ejection performance reliability and the corrosion of metal plate.

When the ink compositions No. 5, in particular, the yellow ink composition and the cyan ink composition were compared with the color ink compositions No. 1 prepared in Example 1, of which pH value was controlled to 10.5, the ink compositions No. 1 produced better results with respect to the ink-ejection performance reliability and the metal corrosion by the ink compositions.

As previously explained, it becomes possible to produce high quality color ink images with excellent color tone and color reproduction performance by using the set of color ink compositions of which lightness index L* and chromaticness indices a* and b* in the L*a*b* color space are particularly specified according to the present invention.

When each of the above-mentioned color ink compositions comprises a particular dye, it is possible to produce high quality color images provided with not only high resistance to water and light, but also excellent color tone, image density and color reproduction performance.

Further, by employing a particular wetting agent in each color ink composition, the preservation stability and the ink-ejection stability are improved.

Furthermore, by employing a particular surfactant in each color ink composition, the drying characteristics of the obtained ink image are improved, and clear color images can be obtained without image blurring or ink spreading in the color boundary portion.

When a particular counter ion is used for the surfactant or coloring agent, the reliability of each color ink composition is further improved.

In addition, by using a particular antiseptic and mildew-proofing agent, the ink composition and the printed ink image can be provided with excellent antiseptic and mildewproofing effect, with high ink-ejecting performance reliability being ensured.

By controlling the pH of the ink composition within a particular range, the corrosion of a metal constituting a nozzle plate can be minimized, and the clogging of the nozzles with the ink composition can be prevented.

When the color ink images are formed on an image receiving medium using the above-mentioned set of ink compositions, high quality color ink images free of ink spreading and image blurring can be obtained by performing dot printing on the image receiving medium in such a manner that the ink compositions are ejected from the nozzles onto the image receiving medium with the printing head scanned over the image receiving medium a plurality of times.

Japanese Patent Application No. 10-056129 filed Feb. 20, 1998 is hereby incorporated by reference.

What is claimed is:

1. A set of color ink compositions for ink-jet printing comprising a yellow ink composition, a magenta ink composition and a cyan ink composition, each of which color ink compositions comprises water, a water-soluble coloring agent, a wetting agent, a surfactant and an antiseptic and mildewproofing agent, each of said yellow ink composition, said magenta ink composition and said cyan ink composition having the following lightness index L*, and chromaticness indices a* and b* in L*a*b* color space, which are calculated from a spectral transmittance of each of said ink compositions which are diluted with water 2000 times:

said yellow ink composition: L*=95±5, a*=−6±5, b*=23±12, said magenta ink composition: L*=75±5, a*=55±25, b*=−28±10, and said cyan ink composition: L*87±5, a*=−35±10, b*=−19±8.

2. The set of color ink compositions as claimed in claim 1, further comprising a black ink composition which comprises water, a water-soluble coloring agent, a wetting agent, a surfactant and an antiseptic and mildewproofing agent, and has the following lightness index L*, and chromaticness indices a* and b* in L*a*b* color space, which are calculated from a spectral transmittance of said black ink composition which is diluted with water 2000 times:

said black ink composition: L*=45±8, a*=−3±5, b*=−5±5.

3. The set of color ink compositions as claimed in claim 1, wherein said coloring agent for use in said yellow ink composition comprises C.I. Direct Yellow 173 and C.I. Direct Yellow 142, said coloring agent for use in said magenta ink composition comprises C.I. Acid Red 52, and said coloring agent for use in said cyan ink composition comprises C.I. Direct Blue 307.

4. The set of color ink compositions as claimed in claim 2, wherein said coloring agent for use in said black ink composition comprises C.I. Direct Black 168.

5. The set of color ink compositions as claimed in claim 2, wherein said wetting agent comprises a mixture of glycerol and diethylene glycol in an amount of 10 to 30 wt. % of the entire weight of each of said ink compositions.

6. The set of color ink compositions as claimed in claim 2, wherein said surfactant comprises a compound represented by formula (1) in an amount of 0.5 to 3 wt. % of the entire weight of each of said ink compositions:

wherein R is a straight-chain or branched alkyl group having 6 to 14 carbon atoms; n is an integer of 3 to 12; and $M^+$ is an alkali metal cation, a quarternary ammonium cation, a quarternary phosphonium cation or an alkanolamine cation.

7. The set of color ink compositions as claimed in claim 6, wherein said alkali metal cation represented by $M^+$ is a cation selected from the group consisting of $Na^+$ and $Li^+$.

8. The set of color ink compositions as claimed in claim 6, wherein said quarternary ammonium cation represented by $M^+$ is a cation of formula (2):

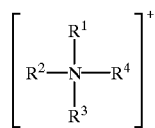

wherein $R^1$ to $R^4$ are each selected from the group consisting of a hydrogen atom, an alkyl group having 1 to 4 carbon atoms, and a halogenated alkyl group having 1 to 4 carbon atoms.

9. The set of color ink compositions as claimed in claim 6, wherein said alkanolamine cation represented by $M^+$ is a cation of formula (3):

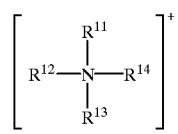

wherein at least one of $R^{11}$ to $R^{14}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms.

10. The set of color ink compositions as claimed in claim 6, wherein said quarternary phosphonium cation represented by $M^+$ is a cation of formula (4):

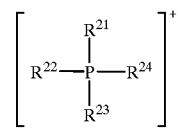

wherein $R^{21}$ to $R^{24}$ are each selected from the group consisting of a hydrogen atom, an alkyl group having 1 to 4 carbon atoms, a hydroxyl alkyl group having 1 to 4 carbon atoms, and a halogenated alkyl group having 1 to 4 carbon atoms.

11. The set of color ink compositions as claimed in claim 2, wherein said coloring agent for use in each of said color ink compositions comprises a dye compound which comprises an alkali metal cation selected from the group consisting of $Na^+$ and $Li^+$.

12. The set of color ink compositions as claimed in claim 2, wherein said coloring agent for use in each of said color ink compositions comprises a dye compound which comprises a quaternary ammonium cation represented by formula (2):

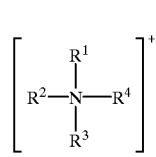

wherein $R^1$ to $R^4$ are each selected from the group consisting of a hydrogen atom, an alkyl group having 1 to 4 carbon atoms, and a halogenated alkyl group having 1 to 4 carbon atoms.

13. The set of color ink compositions as claimed in claim 2, wherein said coloring agent for use in each of said color ink compositions comprises a dye compound which comprises an alkanolamine cation represented by formula (3):

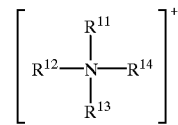

wherein at least one of $R^{11}$ to $R^{14}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms.

14. The set of color ink compositions as claimed in claim 2, wherein said coloring agent for use in each of said color ink compositions comprises a dye compound which comprises a quaternary phosphonium cation represented by formula (4):

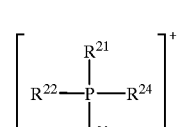

wherein $R^{21}$ to $R^{24}$ are each selected from the group consisting of a hydrogen atom, an alkyl group having 1 to 4 carbon atoms, a hydroxyl alkyl group having 1 to 4 carbon atoms, and a halogenated alkyl group having 1 to 4 carbon atoms.

15. The set of color ink compositions as claimed in claim 2, wherein said antiseptic and mildewproofing agent comprises 1,2-benzisothiazoline-3-on in an amount of 0.2 to 1.0 wt. % of the entire weight of each of said color ink compositions.

16. The set of color ink compositions as claimed in claim 2, wherein each of said color ink compositions has a pH of 8 to 11.

17. A method of forming color ink images on an image receiving medium with a Stöckigt sizing degree of 10 sec or more, using a set of color ink compositions and a printing head comprising a plurality of ink-ejecting orifices, comprising the step of:

performing dot printing on said image receiving medium with said set of ink compositions by ejecting said color ink compositions from said ink-ejecting orifices with said printing head scanned over said image receiving medium a plurality of times, said set of color ink compositions comprising a yellow ink composition, a magenta ink composition, and a cyan ink composition, each of which color ink compositions comprises water, a water-soluble coloring agent, a wetting agent, a surfactant and an antiseptic and mildewproofing agent, and each of said yellow ink composition, said magenta ink composition and said cyan ink composition having the following lightness index L*, and chromaticness indices a* and b* in L*a*b* color space, which are calculated from a spectral transmittance of each of said ink compositions which are diluted with water 2000 times:

said yellow ink composition: L*=95±5, a*=−6±5, b*=23±12, said magenta ink composition: L*=75±5, a*=55±25, b*=−28±10, and said cyan ink composition: L*=87±5, a*=−35±10, b*=−19±8.

18. The method as claimed in claim 17, wherein said set of color ink compositions further comprises a black ink composition which comprises water, a water-soluble coloring agent, a wetting agent, a surfactant and an antiseptic and mildewproofing agent, and has the following lightness index L*, and chromaticness indices a* and b* in L*a*b* color space, which are calculated from a spectral transmittance of said black ink composition which is diluted with water 2000 times:

said black ink composition: L*=45±8, a*=−3±5, b*=−5±5.

19. The method as claimed in claim 17, wherein said coloring agent for use in said yellow ink composition comprises C.I. Direct Yellow 173 and C.I. Direct Yellow 142, said coloring agent for use in said magenta ink composition comprises C.I. Acid Red 52, and said coloring agent for use in said cyan ink composition comprises C.I. Direct Blue 307.

20. The method as claimed in claim 18, wherein said coloring agent for use in said black ink composition comprises C.I. Direct Black 168.

21. The method as claimed in claim 18, wherein said wetting agent for use in each of said color ink compositions comprises a mixture of glycerol and diethylene glycol in an amount of 10 to 30 wt. % of the entire weight of each of said ink compositions.

22. The method as claimed in claim 18, wherein said surfactant for use in each of said color ink compositions comprises a compound represented by formula (1) in an amount of 0.5 to 3 wt. % of the entire weight of each of said ink compositions:

RO(CH₂CH₂O)ₙCH₂COO⁻M⁺ (1)

wherein R is a straight-chain or branched alkyl group having 6 to 14 carbon atoms; n is an integer of 3 to 12; and M⁺ is an alkali metal cation, a quaternary ammonium cation, a quaternary phosphonium cation or an alkanolamine cation.

23. The method as claimed in claim 22, wherein said alkali metal cation represented by M⁺ is a cation selected from the group consisting of Na⁺ and Li⁺.

24. The method as claimed in claim 22, wherein said quaternary ammonium cation represented by M⁺ is a cation of formula (2):

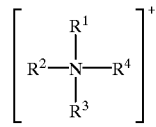

(2)

wherein R¹ to R⁴ are each selected from the group consisting of a hydrogen atom, an alkyl group having 1 to 4 carbon atoms, and a halogenated alkyl group having 1 to 4 carbon atoms.

25. The method as claimed in claim 22, wherein said alkanolamine cation represented by M⁺ is a cation of formula (3):

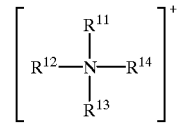

(3)

wherein at least one of R¹¹ to R¹⁴ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms.

26. The method as claimed in claim 22, wherein said quaternary phosphonium cation represented by M⁺ is a cation of formula (4):

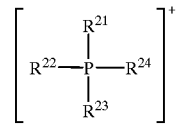

(4)

wherein R²¹ to R²⁴ are each selected from the group consisting of a hydrogen atom, an alkyl group having 1 to 4 carbon atoms, a hydroxyl alkyl group having 1 to 4 carbon atoms, and a halogenated alkyl group having 1 to 4 carbon atoms.

27. The method as claimed in claim 18, wherein said coloring agent for use in each of said color ink compositions comprises a dye compound which comprises an alkali metal cation selected from the group consisting of Na⁺ and Li⁺.

28. The method as claimed in claim 18, wherein said coloring agent for use in each of said color ink compositions comprises a dye compound which comprises a quaternary ammonium cation represented by formula (2):

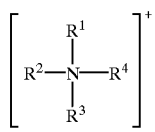

(2)

wherein $R^1$ to $R^4$ are each selected from the group consisting of a hydrogen atom, an alkyl group having 1 to 4 carbon atoms, and a halogenated alkyl group having 1 to 4 carbon atoms.

29. The method as claimed in claim 18, wherein said coloring agent for use in each of said color ink compositions comprises a dye compound which comprises an alkanolamine cation represented by formula (3):

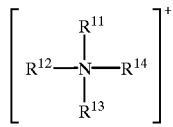

(3)

wherein at least one of $R^{11}$ to $R^{14}$ is a hydroxyl alkyl group having 1 to 4 carbon atoms, and the other is selected from the group consisting of a hydrogen atom, an alkyl group having 1 to 4 carbon atoms, and a halogenated alkyl group having 1 to 4 carbon atoms.

30. The method as claimed in claim 18, wherein said coloring agent for use in each of said color ink compositions comprises a dye compound which comprises a quaternary phosphonium cation represented by formula (4):

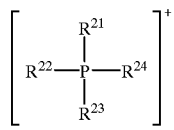

(4)

wherein $R^{21}$ to $R^{24}$ are each selected from the group consisting of a hydrogen atom, an alkyl group having 1 to 4 carbon atoms, a hydroxyl alkyl group having 1 to 4 carbon atoms, and a halogenated alkyl group having 1 to 4 carbon atoms.

31. The method as claimed in claim 18, wherein said antiseptic and mildewproofing agent for use in each of said color ink compositions comprises 1,2-benzisothiazoline-3-on in an amount of 0.2 to 1.0 wt. % of the entire weight of each of said color ink compositions.

32. The method as claimed in claim 18, wherein each of said color ink compositions has a pH of 8 to 11.

* * * * *

UNITED STATES PATENT AND TRADEMARK OFFICE
CERTIFICATE OF CORRECTION

PATENT NO. : 6,120,589
DATED : September 19, 2000
INVENTOR(S) : Akiko Bannai et al.

It is certified that error appears in the above-identified patent and that said Letters Patent is hereby corrected as shown below:

Column 1,
Line 59, "die" should read -- dye --

Column 3,
Line 58, "a* = 35 ±10," should read -- a* = -35 ±10, --.

Column 4,
Line 35, "a* = 35 ±10," should read -- a* = -35 ±10, --;
Line 49, "L* = 95 - 100," should read -- L* = 95 ~ 100, --;
Line 52, "a* = 35 ±5," should read -- a* = -35 ±5, --;
Line 56, "L* = 97 - 100," should read -- L* = 97 ~ 100, --;
Line 59, "a* = 35 ±3," should read -- a* = -35 ±3, --.

Column 6,
Line 67, "formula (2);" should read -- formula (2): --.

Column 7,
Line 54, "$Li^{30}$," should read -- $Li^+$, --.

Column 8,
Line 13, "'San-ai-bac-ZP™'" should read -- "San-ai-bac-AP™" --.

Column 10,
Line 32, "(3) preservation" should read -- (3) Preservation --.

Column 11,
Line 52, "'San-ai-bac-APY" should read -- "San-ai-bac-AP" --.

Signed and Sealed this

Fifteenth Day of January, 2002

Attest:

JAMES E. ROGAN
Director of the United States Patent and Trademark Office

Attesting Officer